(12) United States Patent
Robert

(10) Patent No.: US 11,325,501 B2
(45) Date of Patent: May 10, 2022

(54) METHOD FOR PREHEATING A BATTERY OF AN ELECTRICALLY OPERATED MOTOR VEHICLE, AND CHARGING DEVICE

(71) Applicant: Bayerische Motoren Werke Aktiengesellschaft, Munich (DE)

(72) Inventor: Francois-Xavier Robert, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 144 days.

(21) Appl. No.: 16/727,384

(22) Filed: Dec. 26, 2019

(65) Prior Publication Data

US 2020/0130535 A1 Apr. 30, 2020

Related U.S. Application Data

(63) Continuation of application No. PCT/EP2018/066929, filed on Jun. 25, 2018.

(30) Foreign Application Priority Data

Jun. 27, 2017 (DE) ...................... 10 2017 210 747.2

(51) Int. Cl.
*B60L 58/00* (2019.01)
*B60L 58/24* (2019.01)
(Continued)

(52) U.S. Cl.
CPC ............... *B60L 58/24* (2019.02); *B60L 50/66* (2019.02); *B60L 53/00* (2019.02); *B60L 53/50* (2019.02);
(Continued)

(58) Field of Classification Search
CPC .......... B60L 58/24; B60L 58/27; B60L 53/00; B60L 53/50; B60L 50/66;
(Continued)

(56) References Cited

U.S. PATENT DOCUMENTS 5,490,572 A * 2/1996 Tajiri ................. B60H 1/00392
180/65.1
5,624,003 A * 4/1997 Matsuki .................. B60L 58/26
180/65.1
(Continued)

FOREIGN PATENT DOCUMENTS

DE 10 2009 038 431 A1 2/2011
DE 10 2014 010 300 A1 1/2015
(Continued)

OTHER PUBLICATIONS

International Search Report (PCT/ISA/210) issued in PCT Application No. PCT/EP2018/066929 dated Oct. 30, 2018 with English translation (five (5) pages).
(Continued)

*Primary Examiner* — Naum Levin
(74) *Attorney, Agent, or Firm* — Crowell & Moring LLP

(57) ABSTRACT

A method for preheating a battery of an electrically driven motor vehicle, in particular an electric vehicle or a hybrid vehicle, controls a charging process and a discharging process of the battery in such a way that a minimum temperature of the battery is attained at a departure time of the motor vehicle.

11 Claims, 3 Drawing Sheets

(51) Int. Cl.
*H01M 10/615* (2014.01)
*H01M 10/625* (2014.01)
*H01M 10/63* (2014.01)
*B60L 58/27* (2019.01)
*B60L 50/60* (2019.01)
*H02J 7/00* (2006.01)
*H01M 10/44* (2006.01)
*H01M 10/48* (2006.01)
*H02J 7/02* (2016.01)
*B60L 53/00* (2019.01)
*B60L 53/50* (2019.01)

(52) U.S. Cl.
CPC .......... *B60L 58/27* (2019.02); *H01M 10/443* (2013.01); *H01M 10/486* (2013.01); *H01M 10/615* (2015.04); *H01M 10/625* (2015.04); *H01M 10/63* (2015.04); *H02J 7/0047* (2013.01); *H02J 7/007194* (2020.01); *H02J 7/02* (2013.01); *B60L 2240/545* (2013.01); *H01M 2220/20* (2013.01)

(58) Field of Classification Search
CPC .............. B60L 2240/545; B60L 55/00; B60L 2250/14; H01M 10/615; H01M 10/625; H01M 10/63; H01M 10/443; H01M 10/486; H01M 2220/20; H02J 7/007194; H02J 7/0047; H02J 7/02; H02J 7/04; Y04S 10/126; Y02T 90/12
See application file for complete search history.

(56) References Cited

U.S. PATENT DOCUMENTS

| | | | | |
|---|---|---|---|---|
| 6,056,043 A * | 5/2000 | Strahle | ............... | B60H 1/00492 165/41 |
| 6,072,301 A * | 6/2000 | Ashtiani | ............ | H01M 10/615 320/128 |
| 6,958,197 B2 * | 10/2005 | Tamakoshi | .......... | H01M 10/627 429/62 |
| 7,698,078 B2 * | 4/2010 | Kelty | ..................... | B60L 53/68 702/63 |
| 7,741,816 B2 * | 6/2010 | Kelty | ..................... | B60L 53/14 320/153 |
| 7,932,686 B2 * | 4/2011 | Tsuchiya | ................. | B60L 50/40 318/400.3 |
| 8,509,975 B2 * | 8/2013 | Izumi | ..................... | B60K 6/445 701/22 |
| 8,620,506 B2 * | 12/2013 | Kummer | ............. | H01M 10/486 701/22 |
| 8,816,647 B2 * | 8/2014 | Xu | ....................... | H01M 10/615 320/150 |
| 8,948,952 B2 * | 2/2015 | Niimi | ..................... | B60W 10/06 701/22 |
| 9,114,794 B2 * | 8/2015 | King | ....................... | B60L 58/12 |
| 9,461,495 B2 * | 10/2016 | Kim | ....................... | H02J 7/0021 |
| 9,533,585 B2 * | 1/2017 | Murata | ................... | B60L 53/00 |
| 9,676,283 B2 * | 6/2017 | Jackson | ................. | B60L 58/26 |
| 9,827,871 B2 * | 11/2017 | Del Core | ............... | B60L 58/26 |
| 9,834,114 B2 * | 12/2017 | Hettrich | ................. | B60L 58/27 |
| 10,099,562 B2 * | 10/2018 | Jin | .......................... | B60L 50/60 |
| 10,112,493 B2 * | 10/2018 | Tokito | ................... | B60L 3/0046 |
| 10,124,682 B2 * | 11/2018 | Tsuchiya | ................ | B60L 50/51 |
| 10,186,887 B2 * | 1/2019 | Wang | ..................... | H02J 7/007 |
| 10,369,899 B2 * | 8/2019 | Hettrich | ................. | B60L 58/27 |
| 10,434,892 B2 * | 10/2019 | Ko | ...................... | H01M 10/625 |
| 10,505,238 B2 * | 12/2019 | Izumi | ................... | H01M 10/486 |
| 2006/0069507 A1 * | 3/2006 | Kokubo | ................. | G05D 1/0246 701/301 |
| 2009/0167253 A1 * | 7/2009 | Muraoka | ................. | B60L 1/003 320/152 |
| 2009/0234538 A1 | 9/2009 | Ta et al. | | |
| 2011/0320082 A1 * | 12/2011 | Ishishita | ................. | B60L 50/61 701/22 |
| 2013/0193928 A1 | 8/2013 | Prosser | | |
| 2013/0200845 A1 * | 8/2013 | Bito | ....................... | H02J 7/0042 320/109 |
| 2014/0012445 A1 * | 1/2014 | Fleckenstein | ....... | H01M 10/625 701/22 |
| 2014/0091772 A1 * | 4/2014 | Del Core | ................ | B60L 58/26 320/136 |
| 2014/0180519 A1 | 6/2014 | Niimi | | |
| 2014/0285135 A1 * | 9/2014 | Ji | ......................... | H01M 10/425 320/103 |
| 2016/0023563 A1 * | 1/2016 | Wang | ................. | H02J 7/007194 320/129 |
| 2016/0059717 A1 * | 3/2016 | Murata | ............... | H01M 10/486 701/22 |
| 2016/0059733 A1 * | 3/2016 | Hettrich | ................ | H04W 4/029 701/2 |
| 2016/0107526 A1 * | 4/2016 | Jin | .......................... | G01R 31/36 307/10.1 |
| 2016/0221456 A1 | 8/2016 | Rhodes et al. | | |
| 2018/0312072 A1 * | 11/2018 | Yang | ................... | B60L 11/1842 |

FOREIGN PATENT DOCUMENTS

| | | | |
|---|---|---|---|
| DE | 10 2016 101 100 A1 | | 8/2016 |
| EP | 2 990 257 A1 | | 3/2016 |
| JP | 2000040536 A | * | 2/2000 |
| JP | 2008010295 A | * | 1/2008 |

OTHER PUBLICATIONS

German-language Written Opinion (PCT/ISA/237) issued in PCT Application No. PCT/EP2018/066929 dated Oct. 30, 2018 (eight (8) pages).

German-language Search Report issued in counterpart German Application No. 10 2017 210 747.2 dated Feb. 2, 2018 with partial English translation (12 pages).

\* cited by examiner

METHOD FOR PREHEATING A BATTERY OF AN ELECTRICALLY OPERATED MOTOR VEHICLE, AND CHARGING DEVICE

CROSS REFERENCE TO RELATED APPLICATIONS

This application is a continuation of PCT International Application No. PCT/EP2018/066929, filed Jun. 25, 2018, which claims priority under 35 U.S.C. § 119 from German Patent Application No. 10 2017 210 747.2, filed Jun. 27, 2017, the entire disclosures of which are herein expressly incorporated by reference.

BACKGROUND AND SUMMARY OF THE INVENTION

The invention relates to a method for preheating a battery of an electrically operated motor vehicle, in particular an electric vehicle or a hybrid vehicle. The invention furthermore relates to a charging apparatus of such a motor vehicle and to a motor vehicle having such a charging apparatus.

A rechargeable battery is installed in electrically driven motor vehicles, such as in electric vehicles or in hybrid vehicles having an electric drive. The rechargeable battery is connected to an electricity grid by way of a charging apparatus and charged when required. In this case, the charging process of the battery begins in a suitable manner immediately after connection to the electricity grid. If the vehicle is not used for a relatively long period, for example in the night, the charging process may consequently have been terminated already for a relatively long period at a departure time.

DE 10 2009 038 431 A1 discloses a method in which an expected departure time is set by a user. The charging process, in particular the temporal profile of the charging current of the battery, is controlled here depending on the set departure time in such a way that the charging process is as cost-effective as possible and the fullest possible state of charge of the battery is achieved at the departure time.

During the charging process, the charging current has, in particular, a degressive profile, with the result that the charging current reduces toward the end of the charging process. Based on this and/or if the charging process has been terminated already for a relatively long period, the battery takes on the ambient temperature. If the ambient temperature and consequently the temperature of the battery is low here, for example below 5° C., the power and capacity of such a battery are relatively degraded. Based on this, the battery can be operated only relatively inefficiently and uneconomically.

In addition, further consumers are usually supplied with energy by the battery of the motor vehicle, such as, for example, the lighting system, the heating system or an air-conditioning system, as a result of which the range of the motor vehicle is reduced. If these consumers are operated at a low ambient temperature of, for example, below 5° C., the range of the motor vehicle is accordingly additionally reduced as a result of the inefficient battery operation.

On the one hand, motor vehicles are used relatively often, particularly at low ambient temperatures. On the other hand, a low battery temperature and the resulting uneconomic and inefficient operation of the battery should be prevented. To this end, it is contemplated to preheat the battery or to heat it as quickly as possible after the beginning of operation. It is thus possible, for example, to heat the battery by way of an additional heating apparatus, for example by a relatively inefficient combustion heating system, an electrical heating element or an additional heat exchanger. However, these measures disadvantageously result in additional operating costs, or require additional component parts.

The invention is based on the object of providing a particularly suitable method for preheating the battery, wherein the temperature of the battery of the motor vehicle is intended to have a suitable temperature at the departure time. Furthermore, a charging apparatus particularly suitable for carrying out the method and a corresponding motor vehicle having such a charging apparatus are provided.

According to the invention, the method serves to preheat a rechargeable battery of an electrically driven motor vehicle. In the method, both a charging process and a discharging process of the battery are controlled in such a way that a minimum temperature of the battery is reached or set at a departure time of the motor vehicle. By preheating the battery, the range of the motor vehicle can be improved even in the case of a relatively low ambient temperature.

In particular, the motor vehicle is an electric vehicle or a hybrid vehicle (plug-in hybrid vehicle) having at least one electric motor for driving, wherein the battery of the motor vehicle can be charged by means of an electricity grid.

The invention is based on the knowledge that the capacity and the power of the battery, and therefore also the range of the motor vehicle, are reduced at a temperature of the battery (battery temperature) below an optimum operating temperature. A low ambient temperature is in this case, for example, a temperature below 5° C., with the result that the ambient temperature is lower than an optimum operating temperature of the battery.

After the use of the motor vehicle or after the termination of the charging process of the battery, the battery temperature matches the ambient temperature. Even in the case of a charging process that has not yet finished, the heating of the battery reduces toward the end of the charging process: in this case, a charging current has an, in particular, degressive profile, that is to say the current intensity of the charging current and the resulting operation-related heating power at the battery decreases toward the end of the charging process, with the result that the battery substantially takes on the ambient temperature.

Consequently, the battery temperature is lower than the optimum operating temperature at the departure time of the motor vehicle in the case of a relatively low ambient temperature. As a result, both the capacity and power of the battery and, based on this, the range of the motor vehicle are relatively reduced. By preheating the battery, a minimum temperature of the battery is achieved at the departure time of the motor vehicle, at which minimum temperature the power and the capacity losses of the battery are substantially prevented.

In one suitable embodiment, during the charging process and during the discharging process, a temporal profile of a charging current and of a discharging current of the battery is controlled. Based on the charging current and also the discharging current, the battery heats up owing to operation, wherein the current control is effected in such a way that the battery has reached the minimum temperature at the departure time and that the charging process and the discharging process protect the battery as much as possible, as a result of which damage to the battery is prevented.

In this case, the battery is charged and discharged in a suitable order. In a suitable manner, the battery is first substantially fully charged in a first charging process and then, for example, alternately discharged and charged.

In a preferred embodiment, the departure time is set by a user in a first mode of operation. Alternatively, the departure time is ascertained automatically from user behavior. The charging process and discharging process are controlled depending on the departure time. In this case, the first charging process has a suitable temporal profile so that the charging process is carried out so as to protect the battery as much as possible and/or to save costs as much as possible. For example, relatively low-priced off-peak electricity from the electricity grid can preferably be used.

Alternatively, the battery is preheated in a second mode of operation in such a way that the minimum temperature is reached and is then maintained continuously. The battery is thereby advantageously preheated at the departure time even in case of an undefined, that is to say not stipulated, departure time.

In a suitable manner, a change of the mode of operation by the user is possible or is automatically set from the user behavior. In both modes of operation, the discharging following the first charging process and the subsequent charging of the battery advantageously take place in such a way that the battery has the highest possible state of charge.

The battery is suitably connected to an electricity grid by way of a charging apparatus of the motor vehicle. In this case, during the discharging process of the battery, electrical energy is fed from said battery to the electricity grid. If the electricity grid has a controller, which is coupled to further consumers and/or generators of the electricity grid and to a control unit of the charging apparatus of the motor vehicle, the battery is able to be used in the manner of an intermediate store or a buffer for the electricity grid.

In the case of a relatively high energy demand on the consumers of the electricity grid, energy is able to be fed from the battery to the electricity grid for this purpose. Conversely, energy is able to be fed from generators of the electricity grid to the battery and is able to be stored by means of same. The charging process and the discharging process are controlled taking into account the supply situation of the electricity grid in such a way that the battery reaches the minimum temperature according to the mode of operation, in particular at the departure time, and is maintained. In this case, a current and/or forecast supply demand of the electricity grid can advantageously be met by way of the controller of the electricity grid and the coupling thereof to the control unit of the charging apparatus.

According to one embodiment, the temperature of the battery is measured and the charging process and/or the discharging process is controlled or regulated depending on the measured temperature. In this case, the measured temperature is compared with the minimum temperature. If the measured temperature is lower than the minimum temperature, the battery is discharged and charged in a suitable manner so that the battery reaches the minimum temperature at the departure time.

Alternatively or additionally, a maximum temperature of the battery is prescribed, which is not exceeded during the charging process and during the discharging process so that damage to the battery is prevented. Based on this, the battery can continue to be discharged and charged and used, for example, in the manner of an energy store or buffer of the electricity grid.

In an alternative embodiment, the battery temperature is ascertained from the temporal profile of the charging current and of the discharging current by the control unit of the charging apparatus, and the charging process and the discharging process are controlled depending thereon.

The charging apparatus of the electrically driven vehicle has a connection for connecting the battery to the electricity grid. Furthermore, the charging apparatus is also designed to preheat the battery. For this purpose, the charging apparatus has a first interface, a second interface and the control unit. The first interface is provided or established to a temperature sensor arranged on or in the battery, by which temperature sensor the temperature of the battery is measured. The second interface serves to receive the set departure time. The second interface is embodied, for example, as a radio interface to a wireless network (WLAN, UMTS, BLUETOOTH, etc.) and/or as an interface to an operator control apparatus in a cockpit of the motor vehicle.

The control unit is coupled to the first and to the second interface, as a result of which the control unit controls or regulates the charging process and the discharging process in a suitable manner based on the detected temperature and the set departure time. This makes it possible, by means of the charging apparatus, for the battery to reach or—avoiding exceeding a maximum temperature—to exceed a minimum temperature at the departure time. The control unit has, for example, a (micro)controller, a field-programmable gate array (FPGA) or an application-specific integrated circuit (ASIC). User inputs or the user behavior are able to be stored or are stored in a suitable manner in a memory of the control unit, with the result that the battery can be preheated according to the input or the user behavior.

According to an advantageous embodiment, the charging apparatus has a third interface to a control device of the motor vehicle. As a result, suitable control and operation of consumers in the motor vehicle are made possible by means of the battery during the discharging process. For example, coupling the charging apparatus to the control device of the motor vehicle makes it possible to operate an air-conditioning system of the motor vehicle depending on the departure time. In this case, the battery is preheated by the discharging process and an interior of the motor vehicle is air-conditioned at the departure time.

According to an expedient development, the charging apparatus has a fourth interface to the controller of the electricity grid. An exchange of data between the charging apparatus and the controller of the electricity grid is made possible by means of said fourth interface. As a result, the charging process and the discharging process of the battery are adjusted to the behavior of the user and/or to the setting of the departure time by means of the user, wherein the charging process and the discharging process can be taken into account in a consumer profile or in a generator profile of the electricity grid. As a result, costs can advantageously be saved by virtue of a cost-effective off-peak electricity tariff preferably being used, for example.

The motor vehicle has a charging apparatus according to one of the variants described above. The battery is particularly advantageously able to be preheated and/or is preheated by means of the charging apparatus. The capacity and power of the battery and the range of the motor vehicle are advantageously not reduced based on this even in the case of low ambient temperatures at the departure time. In this case, the preheating of the battery is able to be adjusted to a driving profile of the user. To preheat the battery, no additional components or component parts are required in the motor vehicle here, such as an electrical heating apparatus or a combustion heating system, for example, which saves installation space and costs. Furthermore, when the charging apparatus is coupled to the controller of the electricity grid, the battery is preheated in such a way that the energy supplied from the battery to the electricity grid can be used by consumers in the grid, as a result of which no additional costs arise to preheat the battery.

Other objects, advantages and novel features of the present invention will become apparent from the following detailed description of one or more preferred embodiments when considered in conjunction with the accompanying drawings.

Parts that correspond to one another are provided with the same reference signs in all of the figures.

DETAILED DESCRIPTION OF THE DRAWINGS

Figure 1:
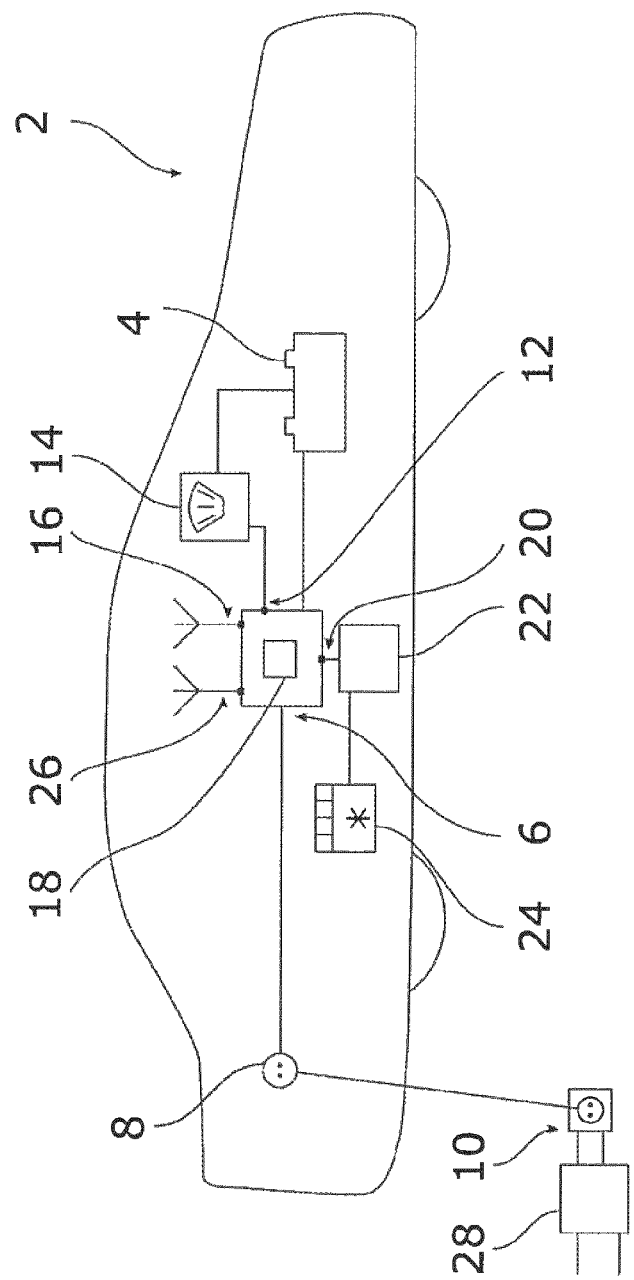
FIG. 1 is a schematic side view of a motor vehicle having a battery and a charging apparatus.

FIG. 1 schematically illustrates an electrically driven motor vehicle 2 having a battery 4. The electrically driven motor vehicle 2 may be an electric vehicle or a hybrid vehicle having an electric drive. Furthermore, the motor vehicle 2 has a charging apparatus 6 having a connection 8, by which the charging apparatus 6 can be connected to an electricity grid 10. In addition, the charging apparatus 6 has a first interface 12 to a temperature sensor 14. A temperature T of the battery 4 is measured by way of the temperature sensor 14. A set departure time $t_A$ is received by a second interface 16 of the charging apparatus 6.

In the exemplary embodiment of FIG. 1, the second interface 16 is embodied as a radio interface to a wireless network. By way of said interface, for example, the departure time $t_A$ can be set for a user conveniently by use of a smart phone.

A control unit 18 of the charging apparatus 6 receives both the temperature T of the battery 4 measured by means of the temperature sensor 14 and the departure time $t_A$ set by the user. Alternatively, the departure time $t_A$ is also able to be ascertained from a user behavior stored in the control unit 18.

A temporal profile of a charging process and of a discharging process of the battery 4 is set by the control unit 18 of the charging apparatus 6 depending on the set departure time $t_A$ and based on the measured temperature T. In this case, the charging process and the discharging process are controlled in such a way that the battery 4 is preheated at the departure time $t_A$ and a minimum temperature $T_{min}$ of the battery 4 is reached at the departure time $t_A$. As a result, a reduction in the power and the capacity of the battery 4 is prevented even in the case of relatively low ambient temperatures.

To preheat the battery 4 of the motor vehicle 2, the battery is heated owing to operation by way of a charging current and by way of a discharging current based on ohmic losses that arise and based on thermodynamic effects, in particular based on a change in the entropy of the battery 4 in the case of a thermochemical reaction during the charging and during the discharging process. In a suitable manner, the temporal profile of the charging current and of the discharging current during the charging process and during the discharging process is controlled in such a way that the minimum temperature $T_{min}$ of the battery 2 is reached at the departure time $t_A$.

The charging apparatus 6 furthermore has a third interface 20 to a control device 22 of the motor vehicle 2. As a result, the discharging process is able to be used more advantageously in order to operate a consumer of the motor vehicle 2, wherein the discharging process is controlled in such a way that the battery 4 is suitably preheated.

In the exemplary embodiment of FIG. 1, the consumer is embodied as an air-conditioning system 24. This can be used to air-treat an interior of the motor vehicle 2 in such a way that a temperature perceived to be comfortable by the user is set there at the departure time $t_A$. Alternatively or additionally, the consumer can increase the safety of the motor vehicle 2, for example by virtue of iced windscreens being de-iced by way of a heating apparatus. The battery 2 is preheated depending on the departure time $t_A$ during operation of the consumer.

A fourth interface 26 of the charging apparatus 6 is embodied as a radio interface. The fourth interface 26 serves to couple the charging apparatus 6 of the motor vehicle 2 to a controller 28 of the electricity grid 10.

The battery 4 of the motor vehicle 2 is connected to the electricity grid 10 by means of the charging apparatus 6. In this case, the coupling of the charging apparatus 6 to the electricity grid 10 makes it possible for the control of the charging process and of the discharging process to function in a cost-optimized manner and for the battery 4 to be preheated at the departure time $t_A$. For example, a low-priced off-peak electricity tariff can preferably be used to charge the battery. During the discharging process, the battery 4 feeds electrical energy to the electricity grid 10, as an alternative to operating a consumer in the motor vehicle 2. The temporal profile of the discharging process is controlled here in such a way that the battery 4 is suitably heated depending on the departure time $t_A$, and that the battery 4 feeds energy to the electricity grid 10 according to a consumer profile of said electricity grid. The battery 4 can thus be used as an additional energy store for the electricity grid 10.

Figure 2:
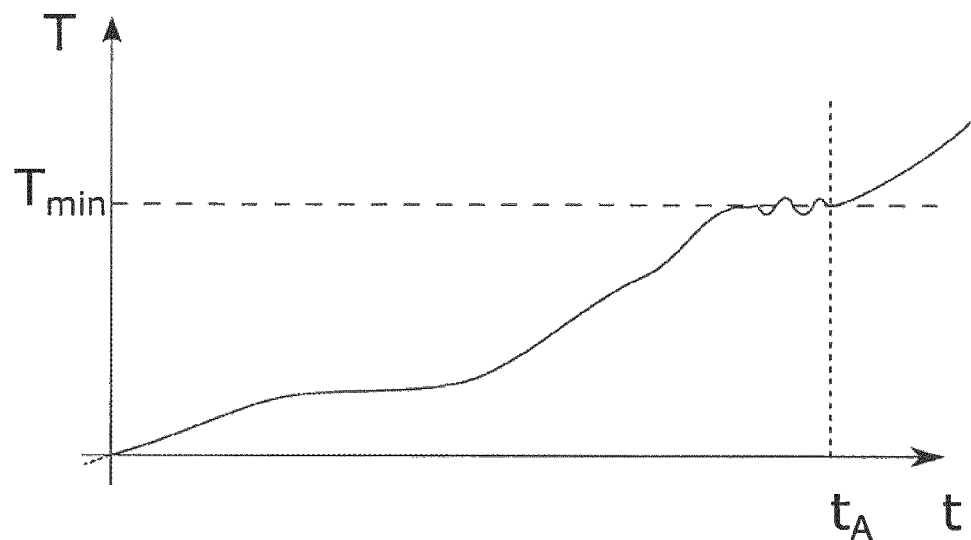
FIGS. 2 to 4 are temporal profiles of the temperature of a battery, wherein a minimum temperature of the battery is reached at a departure time.
Figure 3:
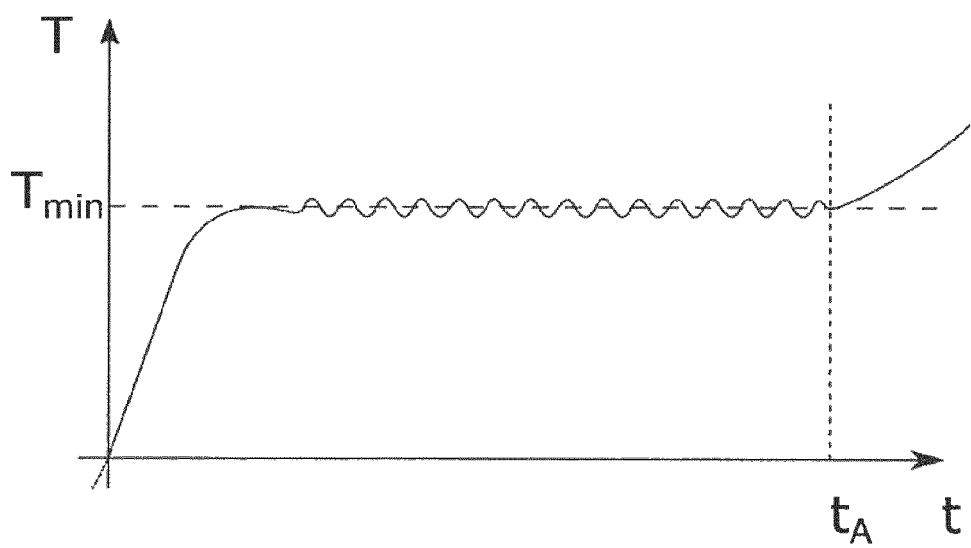
Figure 4:
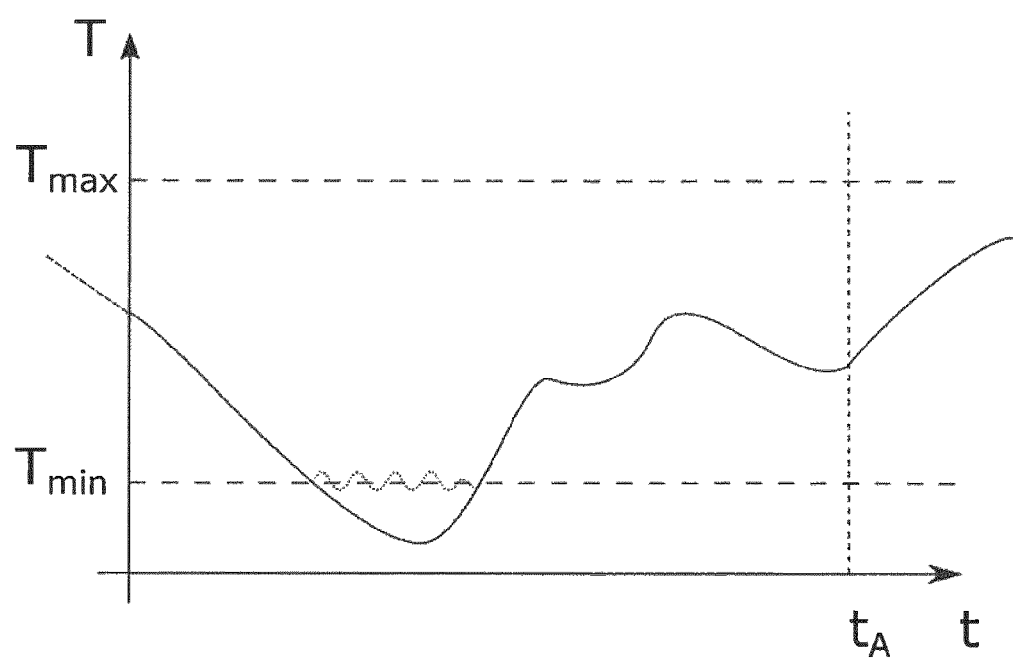

FIGS. 2 to 4 outline temporal profiles of the temperature T of the battery 4. The charging process and the discharging process of the battery 4 are controlled here in such a way that the battery 4 reaches the minimum temperature at the departure time $t_A$.

In addition, the temperature T of the battery 4 is measured by means of the temperature sensor 14. The charging process and the discharging process are controlled or regulated according to the measured temperature T and the departure time $t_A$. In this case, the measured temperature T is compared with the minimum temperature $T_{min}$. If the measured temperature T is lower than the minimum temperature $T_{min}$, the battery 4 is discharged and charged so that the battery 4 reaches the minimum temperature $T_{min}$ at the departure time $t_A$. This regulation of the temperature T by the minimum temperature $T_{min}$ is outlined in FIGS. 2 and 3 as undulated profiles of the temperature T.

FIGS. 2 to 4 furthermore show a temperature T of the battery 4 that increases over time t after the departure time $t_A$. The reason for this is that, owing to operation, a power demand on the battery 4 during driving operation is increased, with the result that the temperature T of the battery 4 increases.

In a first mode of operation, the departure time $t_A$ is set by the user or the departure time $t_A$ is ascertained from the user behavior. Based on this, the charging process and the discharging process are regulated or controlled in such a way that the battery 4 is used in a manner that protects the battery as much as possible and/or that saves costs as much as possible, for example as an energy store of the electricity grid 10. In this case, the temperature T of the battery 4 is intended to reach the minimum temperature $T_{min}$ substantially only at the departure time $t_A$.

In a second mode of operation, the battery 4 is preheated in such a way that the minimum temperature $T_{min}$ is reached and then maintained continuously. As a result, the battery 4 is advantageously preheated practically at any time t even in the case of an undefined departure time $t_A$.

To this end, FIG. 3 shows by way of example a temporal profile of the temperature T of the battery 4, in which the temperature T reaches the minimum temperature $T_{min}$ relatively quickly. The temperature T of the battery 4 is subsequently maintained at the minimum temperature $T_{min}$ by suitable control or regulation of the charging process and of the discharging process.

FIG. 4 outlines a temporal profile of the temperature T of the battery 4, in which the temperature T is initially greater than the minimum temperature $T_{min}$. For example, in this case, the motor vehicle 2 was parked a relatively short time ago. The temperature T of the battery 4 matches the ambient temperature and is reduced based on this.

In the second mode of operation, cooling of the battery 4 below the minimum temperature $T_{min}$ by corresponding control or regulation of the charging process and of the discharging process is prevented, which is illustrated in FIG. 4 as a punctiform regulation profile of the temperature 4.

In the first mode of operation, cooling of the battery 4 below the minimum temperature $T_{min}$ is effected here first. The control or regulation of the charging process and/or of the discharging process takes place depending on the departure time $t_A$ so that the minimum temperature $T_{min}$ has to be achieved only at the departure time $t_A$.

The charging process and the discharging process are controlled in both modes of operation in such a way that the minimum temperature $T_{min}$ is reached at the departure time $t_A$ and that a maximum temperature $T_{max}$ of the battery 4 is not exceeded by the charging process and the discharging process. The battery 4 is used here, for example, in the manner of a buffer or energy store of the electricity grid 10 and/or feeds energy to consumers, such as the air-conditioning system 24 of the motor vehicle 2, for example.

The invention is not restricted to the exemplary embodiments described above. Rather, other variants of the invention may also be derived therefrom by a person skilled in the art without departing from the subject matter of the invention. In particular, it is furthermore the case that all individual features described in conjunction with the exemplary embodiments may also be combined with one another in some other way without departing from the subject matter of the invention.

LIST OF REFERENCE SIGNS

2 Motor vehicle
4 Battery
6 Charging apparatus
8 Connection
10 Electricity grid
12 First interface
14 Temperature sensor
16 Second interface
18 Control unit of the charging apparatus
20 Third interface
22 Control device of the motor vehicle
24 Air-conditioning system
26 Fourth interface
28 Controller of the electricity grid
$t_A$ Departure time
T Temperature
$T_{min}$ Minimum temperature The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for preheating a battery of an electrically driven motor vehicle, the method comprising:
controlling both a charging process and a discharging process of the battery such that a minimum temperature of the battery is reached at a departure time of the motor vehicle without applying heat from an external source,
wherein during the charging process and during the discharging process of the battery, a temporal profile of a charging current and of a discharging current of the battery is controlled in order to heat the battery to the minimum temperature at the departure time by the charging current and by the discharging current, and
wherein the temporal profile of the charging current and of the discharging current of the battery is controlled such that the battery is first fully charged in a first charging process and then alternately discharged and charged.

2. The method according to claim 1, wherein
the departure time of the motor vehicle is set by a user, and
the battery is preheated depending on the departure time.

3. The method according to claim 1, wherein
the battery is preheated such that the minimum temperature of the battery is maintained continuously.

4. The method according to claim 1, wherein
electrical energy is fed to an electricity grid during the discharging process from the battery, which battery is connected to the electricity grid by a charging device of the motor vehicle.

5. The method according to claim 1, wherein
a temperature of the battery is measured, and
the charging process and/or the discharging process is controlled or regulated depending on the measured temperature.

6. The method according to claim 1, wherein
the vehicle is an electric vehicle or a hybrid vehicle.

7. A charging apparatus of an electrically driven motor vehicle, the charging apparatus comprising:
a first interface to a temperature sensor for measuring a temperature of a battery of the vehicle,
a second interface for receiving a set departure time, and
a control unit for setting a charging process and a discharging process of the battery based on the detected temperature and the set departure time, wherein:
the control unit controls both the charging process and the discharging process of the battery such that a minimum temperature of the battery is reached at the set departure time of the motor vehicle without applying heat from an external source, and
during the charging process and during the discharging process of the battery, the control unit controls a temporal profile of a charging current and of a discharging current of the battery in order to heat the battery to the minimum temperature at the departure time by the charging current and by the discharging current, wherein the temporal profile of the charging current and of the discharging current of the battery is controlled such that the battery is first fully charged in a first charging process and then alternately discharged and charged.

8. The charging apparatus according to claim 7, further comprising:
a third interface to a control device of the motor vehicle for operating an air-conditioning system during the discharging process.

9. The charging apparatus according to claim 7, further comprising:
a fourth interface to a controller of an electricity grid.

10. The charging apparatus according to claim 7, wherein the vehicle is an electric vehicle or a hybrid vehicle.

11. A motor vehicle comprising a charging apparatus according to claim 7.

* * * * *